United States Patent [19]
Gunter, Jr. et al.

[11] Patent Number: 5,173,239

[45] Date of Patent: Dec. 22, 1992

[54] PROCESS FOR STRETCHING A WEB OF MATERIAL

[75] Inventors: Jack E. Gunter, Jr., Pisgah Forest, N.C.; Neil I. Steinberg, Greer, S.C.; John A. Stewart, III, Pickerington, Ohio

[73] Assignee: E. I. Du Pont de Nemours and Company, Wilmington, Del.

[21] Appl. No.: 751,850

[22] Filed: Aug. 29, 1991

[51] Int. Cl.⁵ .............................................. B29C 55/06
[52] U.S. Cl. ...................................... 264/288.4; 26/71; 264/290.2
[58] Field of Search ........................... 284/288.4, 290.2; 26/71, 72, 89, 92, 93, 106

[56] References Cited

U.S. PATENT DOCUMENTS

| | | | |
|---|---|---|---|
| 2,728,941 | 1/1956 | Allis et al. | 264/290.2 |
| 2,779,684 | 1/1957 | Aller | 264/290.2 |
| 3,124,834 | 3/1964 | Vandierendonek | 264/DIG. 28 |
| 3,132,375 | 5/1964 | Koppehile | 264/290.2 |
| 3,172,150 | 3/1965 | Dornier | 26/72 |

*Primary Examiner*—James Lowe

[57] ABSTRACT

A process for longitudinally stretching a polymeric film having thickened longitudinal edges while the film is constrained in the lateral dimension by a plurality of successive pairs of grippers, the improvement comprising first guiding the film with a first group of gripper pairs having a predetermined clearance therebetween; and then gripping the film with a second group of gripper pairs with a predetermined amount of force. An apparatus for use in the process is also disclosed.

10 Claims, 6 Drawing Sheets

PROCESS FOR STRETCHING A WEB OF MATERIAL

FIELD OF THE INVENTION

This invention relates to the longitudinal stretching of a web of material, such as a sheet of polymeric film or the like. More particularly, this invention relates to a process for longitudinally stretching a web of material while constraining the lateral dimension of the web and an apparatus for use in the process.

BACKGROUND OF THE INVENTION

It is widely known in the art, particularly in the manufacture of polymeric films, to orient the film by stretching under heat. It is also known that certain properties of polymeric films in particular, such as tear strength, tensile strength, light transmission, haze, etc. can be improved by stretching the film. Examples of such polymeric film include polypropylene, polystyrene, nylon, polyimides, polyesters, polycarbonates and polyolefins. Such films will be referred to herein as "films." The orientation of polymeric films can be uniaxial, i.e., in either the longitudinal or lateral direction, or biaxial, i.e., in both directions at right angles to one another.

Generally, the biaxial orientation of films is a multi-step process. First, a molten polymer is cast in a continuous molten sheet and quenched to cool the film below the glass transition temperature of the polymer to form a self-supporting amorphous sheet. The longitudinal edges of the sheet of film are typically formed to be thicker than the rest of the film or are provided with thickened beads of polymeric material. The film then undergoes stretching processes to orient and crystallize the film. A longitudinal stretcher heats the film above the glass transition temperature of the polymer and stretches the sheet of film 2 to 10 times in the longitudinal or machine direction and then cools the film. A tenter frame stretcher heats the film above the glass transition temperature and stretches the film 2 to 10 times in the lateral or widthwise direction. These stretching operations may occur in sequence or they may occur simultaneously.

Several optional steps may be employed in the above process, depending upon the particular desired use of the film. For example, subcoatings such as gelatin or resin may be applied to the as cast sheet of film prior to stretching. Likewise, special purpose coatings such as antistatic, matte, or acrylic coatings may be applied, typically after stretching. In addition, it may be desired to heat the film further in the tenter frame, prior to cooling it below the glass transition temperature, to heat-set and further crystallize the film. This step, as is known from Alles, U.S. Pat. No. 2,779,684, may be followed by a heat relaxing step to pre-shrink the film and stabilize its planar dimensions. It is also possible for the film to undergo surface treatments such as flame treatment or corona discharge.

A longitudinal stretcher utilizes two pairs of nip rollers positioned at the entrance and exit of the machine, with the rollers at the exit moving at a greater rate of speed to stretch the film in the machine direction. Because contact with the rollers may damage the film surface, the film does not engage either set of rollers unless it is below the glass transition temperature. Thus, in the stretcher the film must be heated above the glass transition temperature, stretched and then cooled below the glass transition temperature which necessarily requires a long span between the entrance and exit nip rollers. A long span in the stretcher, however, is known to cause a problem in that the lateral dimension of the film will tend to decrease as the film is being longitudinally stretched, a condition known as "neck-in."

In order to prevent neck-in from occurring, it is necessary to retain the longitudinal edges of the film from being pulled inward, and thereby maintain the lateral dimension of the film during stretching. Several methods of constraining the longitudinal edges of the film while stretching are known. U.S. Pat. No. 3,124,834 to Vandierendonck and U.S. Pat. No. 3,132,375 to Koppehele, for example, teach the use of rails positioned on either side of the stretcher. The rails are provided with channels which are adapted to receive therein the beaded or thickened longitudinal edges of the film. It is known to utilize a plurality of grippers positioned above and below the plane of the film and on both sides of the stretcher to constrain the longitudinal edges of the film. A predetermined, fixed clearance is maintained between the upper and lower grippers to provide a channel for the film, with the thickened edges of the film being disposed on the outside of the grippers. To insure proper operation, it was necessary to maintain the gripper clearance within narrow limits as compared to the average thickness of the film. If the clearance was too narrow, the grippers would cut a groove into the film, resulting in "dusting" of the polymeric material. The term "dusting" refers to the appearance on the film of dried flakes or particles (i.e., dust) of polymeric material. If the gripper clearance was too large, the thickened edges of the film would pull through the grippers, resulting in neck-in. A typical example would be for the gripper clearance to be no more than 0.002 inches [0.0051 cm] greater than the average thickness of the film. Because the thickness of the film changes as the film is stretched, however, the gripper clearance had to be set within the narrow tolerance limits based upon the average thickness of the film at the location of that particular gripper pair. A somewhat greater clearance tolerance was acceptable during the first phase of stretching, where the film is not thoroughly heated and is thus resistant to stretching.

The need to maintain the gripper clearance within the narrow tolerance limits during the stretching operation resulted in several disadvantages. It was common, for example, for the grippers to move out of adjustment, which necessitated periodic stoppage of the stretcher to check and readjust the gripper clearance. Similarly, if several types of films having different thicknesses were to be run on the same stretcher, it was necessary to shut down the stretcher and manually set the clearance for each gripper pair with a feeler gauge. Because of the large number of grippers typically employed in the stretcher, this tedious and labor intensive task would take upwards of eight hours to complete and would inevitably result in at least some of the grippers being missed completely or being improperly adjusted. A further disadvantage was that the gripper clearance, as a function of average film thickness, was often difficult to determine, particularly when manufacturing new or different films. As the line speeds in the film manufacturing process increase, these disadvantages become more acute and the costs in terms of manufacturing efficiency rise substantially.

SUMMARY OF THE INVENTION

We have invented an improved process for longitudinally stretching a sheet of film and an apparatus for use in that process which overcomes the above mentioned disadvantages, is quick and simple to establish and operate, and results in improved efficiency, flexibility and productivity in the manufacture of films. Accordingly, it is an object of the invention to provide an improved process for the longitudinal stretching of films. It is another object of the invention to provide an apparatus for use in the improved process for the longitudinal stretching of films.

In accordance with the invention, an improved process for longitudinally stretching a sheet of film having thickened longitudinal edges while the film is being transported in the longitudinal direction and while constraining the film in the lateral dimension with a plurality of successive gripper pairs positioned adjacent and inside the thickened longitudinal edges of the film and above and below the film, wherein the improvement comprises:
 a) first guiding the film for a predetermined distance with a first group of said gripper pairs having a predetermined clearance therebetween; and
 b) gripping the film with a second group of said gripper pairs with a predetermined amount of force applied in a direction substantially perpendicular to the film.

Also in accordance with the invention, an apparatus for use in a longitudinal stretcher for the longitudinal stretching of films having thickened longitudinal edges, the longitudinal stretcher being of the type having means for engaging and stretching the film, means for heating and cooling the film above and below the glass transition temperature of the film, and a plurality of successive gripper pairs disposed inside and adjacent to the thickened longitudinal edges of the film and above and below the film, said apparatus comprising:
 a) a first group of gripper pairs disposed above and below the plane of the film;
 b) means for adjustably moving said first group of gripper pairs relative to one another to provide a predetermined amount of clearance therebetween;
 c) a second group of gripper pairs disposed above and below the plane of the film and adjacent to said first group of gripper pairs; and
 d) means for adjustably moving said second group of gripper pairs relative to one another to grip the film with a predetermined amount of force in a direction substantially perpendicular to the plane of the film.

BRIEF DESCRIPTION OF THE DRAWING FIGURES

DETAILED DESCRIPTION OF THE EMBODIMENTS

Figure 1:
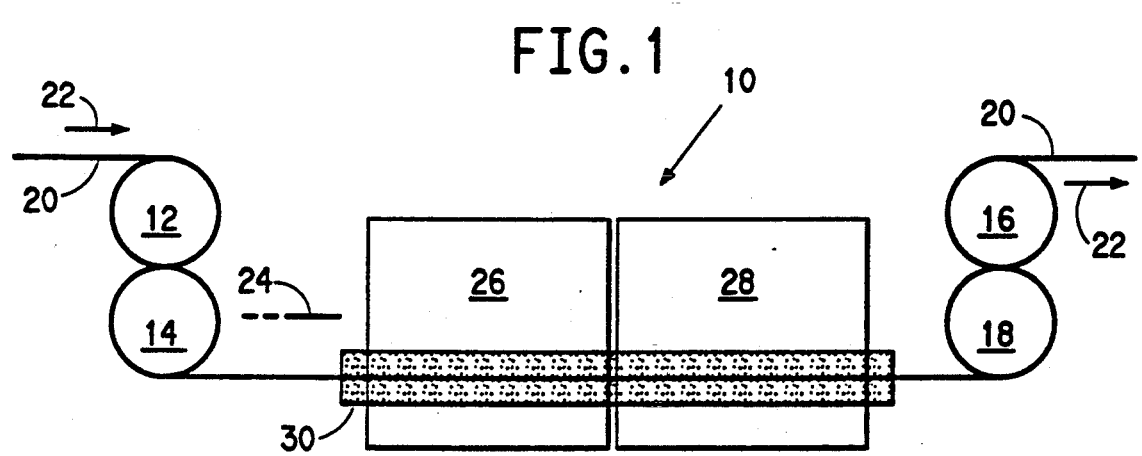
FIG. 1 is a schematic illustration of a longitudinal stretcher and the process for stretching a sheet of film.

With reference first being made to FIG. 1, a longitudinal stretcher 10 comprises a pair of nip rollers 12,14 at the entrance of the stretcher and a pair of nip rollers 16,18 at the exit of the stretcher. The film 20 enters the stretcher at the entrance thereof and is wrapped in S-fashion around nip rollers 12,14 and travels through the stretcher in the direction indicated by arrows 22. Thereafter, the film 20 passes through a first heating zone 24, a second heating zone 26 and a cooling zone 28 before engaging, in S-wrapped fashion, the exit nip rollers 16,18. Beginning before the second heating zone 26 and ending after the cooling zone 28, film 20 is engaged with a plurality of gripper pairs 30. Although the process just described utilizes two adjacent heating zones 24 and 26, it is to be understood that, if desired, only one or more than two heating zones may be employed. The heating and cooling steps in the above process are accomplished by known methods, such as radiant heating or air impingement heating and cooling. The physical stretching of the film occurs in the second heating zone 26 and the beginning portion of cooling zone 28 of FIG. 1, where film 20 is in a glass transition state, since the nip rollers 16, 18 are rotating at a faster rate than the nip rollers 12, 14. The plurality of gripper pairs 30 constrain the longitudinal edges of the film 20 and thus retain the lateral dimension of the film during stretching. It is to be understood that the plurality of grippers 30 is disposed on both sides of stretcher 10 and that the following discussion with respect to the grippers on the right side of the stretcher (as seen in FIG. 1) is equally applicable to the grippers on the left side of the stretcher.

Figure 2A:
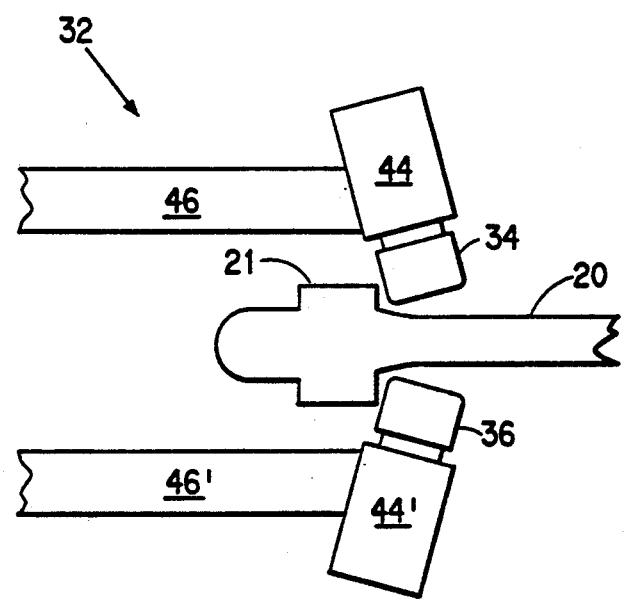
FIG. 2A is a schematic illustration of a gripper pair as seen along the direction of travel of the film in the stretcher, particularly illustrating the guiding of the film by the grippers.

In the process of the present invention, the plurality of grippers can be divided into two groups by function. The first group of grippers guide and support the film 20, without exerting any force on the film surface. The second group of grippers actually grip the film between upper and lower grippers with a predetermined amount of force applied substantially perpendicular to the plane of the film. FIG. 2A schematically illustrates a gripper pair in the first group of grippers, wherein the grippers guide and support the film. As seen in FIG. 2A, the guiding gripper pair 32 comprises an upper gripper 34 and a lower gripper 36 which are positioned above and below the plane of film 20, respectively. The grippers 34, 36 are positioned to engage the film 20 at a location inside and adjacent to the thickened longitudinal edge 21 of the film, and are spaced in relation to one another, whereby a gap or channel is defined between the upper and lower grippers. The vertical dimension of the gap, that is, the distance between gripper 34 and gripper 36, is referred to herein as the gripper clearance. In accordance with the process of the present invention, the gripper clearance is from zero to 0.015 inches [0.0381 cm] greater than the average thickness of the film 20. In a preferred embodiment, the clearance varies among the grippers in the first group, with the clearance being greatest for the first gripper pair in the group and smallest for the last gripper pair in the group. The grippers in FIG. 2A are shown in spaced relation to the surfaces of the film 20 for purposes of clarity, it is to be understood, however, that the grippers may actually contact the surfaces of the film.

Figure 2B:
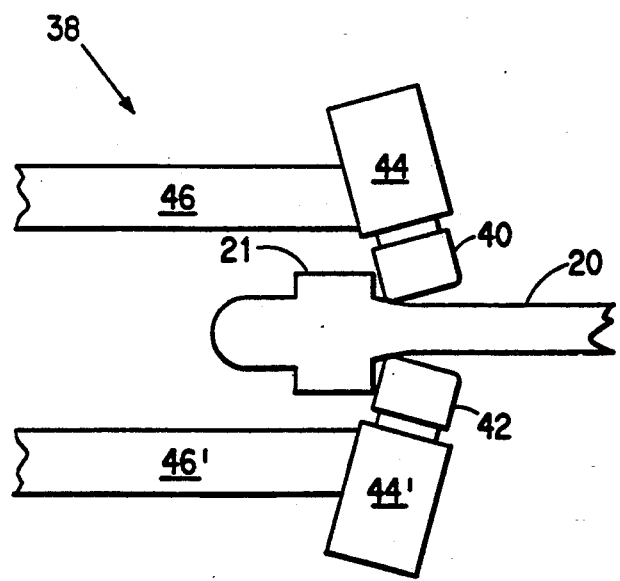
FIG. 2B is a schematic illustration similar to that of FIG. 2A, particularly illustrating the gripping of the film with a predetermined amount of force.

FIG. 2B illustrates a force control gripper pair 38 in the second group of grippers, wherein the film is being gripped between the upper gripper 40 and the lower gripper 42 with a predetermined amount of force. As was the case with the grippers in the first group, force control grippers 40, 42 are positioned to engage the film 20 at a location inside and adjacent to the thickened longitudinal edges 21 of film 20. The second group of grippers is positioned within the stretcher at a location where the film reaches the glass transition state and actually begins to stretch. It has been observed that using force control grippers to grip the film at an earlier point in the process is not advantageous in that the tolerance limitations on the amount of force that can be applied are too narrow and it is difficult to prevent dusting, grooving, or neck-in of the film.

Figure 3:
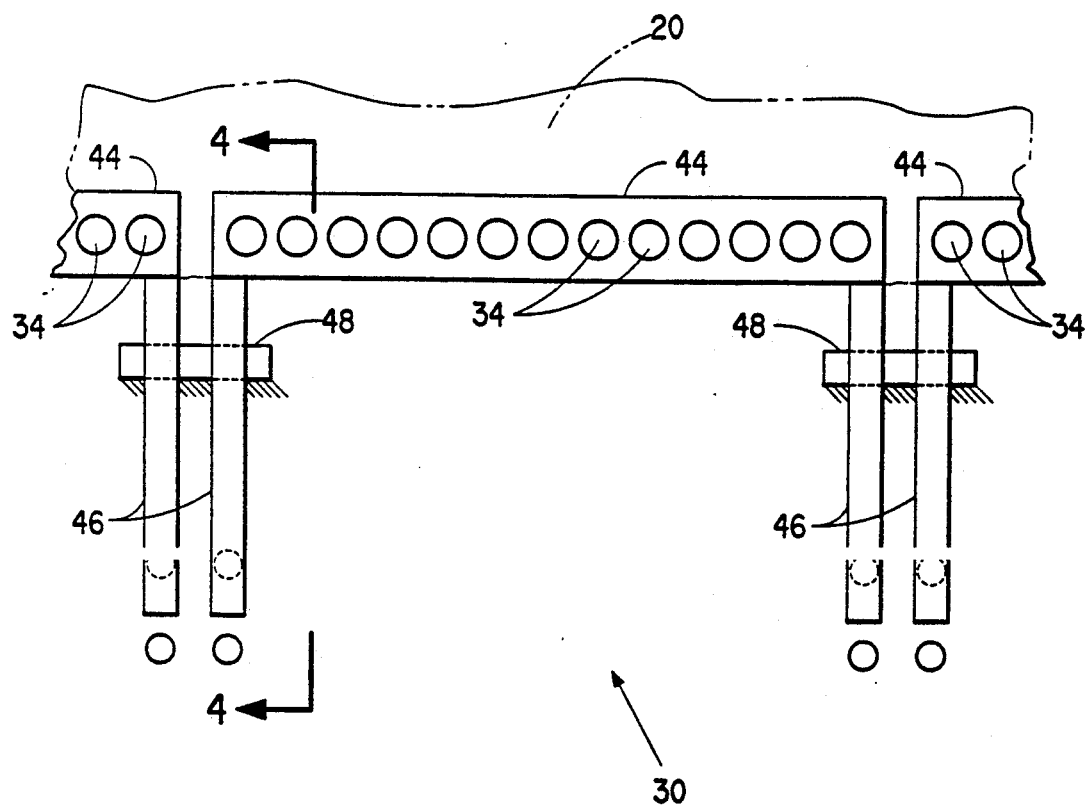
FIG. 3 is a plan view, partially in schematic, of a plurality of successive grippers disposed above the plane of the film, particularly illustrating the block arrangement of the grippers.

With reference now being made to FIG. 3, the plurality of grippers 30 are carried by rectangular beams 44 which are disposed above and below the plane of film 20, with only the upper beams being shown in FIG. 3. It is to be understood that the beams 44 disposed below the plane of film 20 are in substantial register with the upper beams 44 illustrated in FIG. 3. The grippers 30 are positioned adjacent to one another in beams 44 so as to form successive gripper pairs. Beams 44 are supported by a pair of support members 46 connected to beam 44 at each end thereof. Support members 46 are mounted to the stretcher by pivot shafts 48 whereby beams 44 and grippers 30 carried thereby are movable toward or away from film 20, the significance of which is explained hereinbelow. Each of the support members 46 is provided with means for adjusting and controlling the pivotal movement thereof at the end of the support member 46 remote from the attachment to beam 44. Each upper and lower beam and their associated grippers define a gripper block or gripper zone as those terms are used herein.

Figure 4:
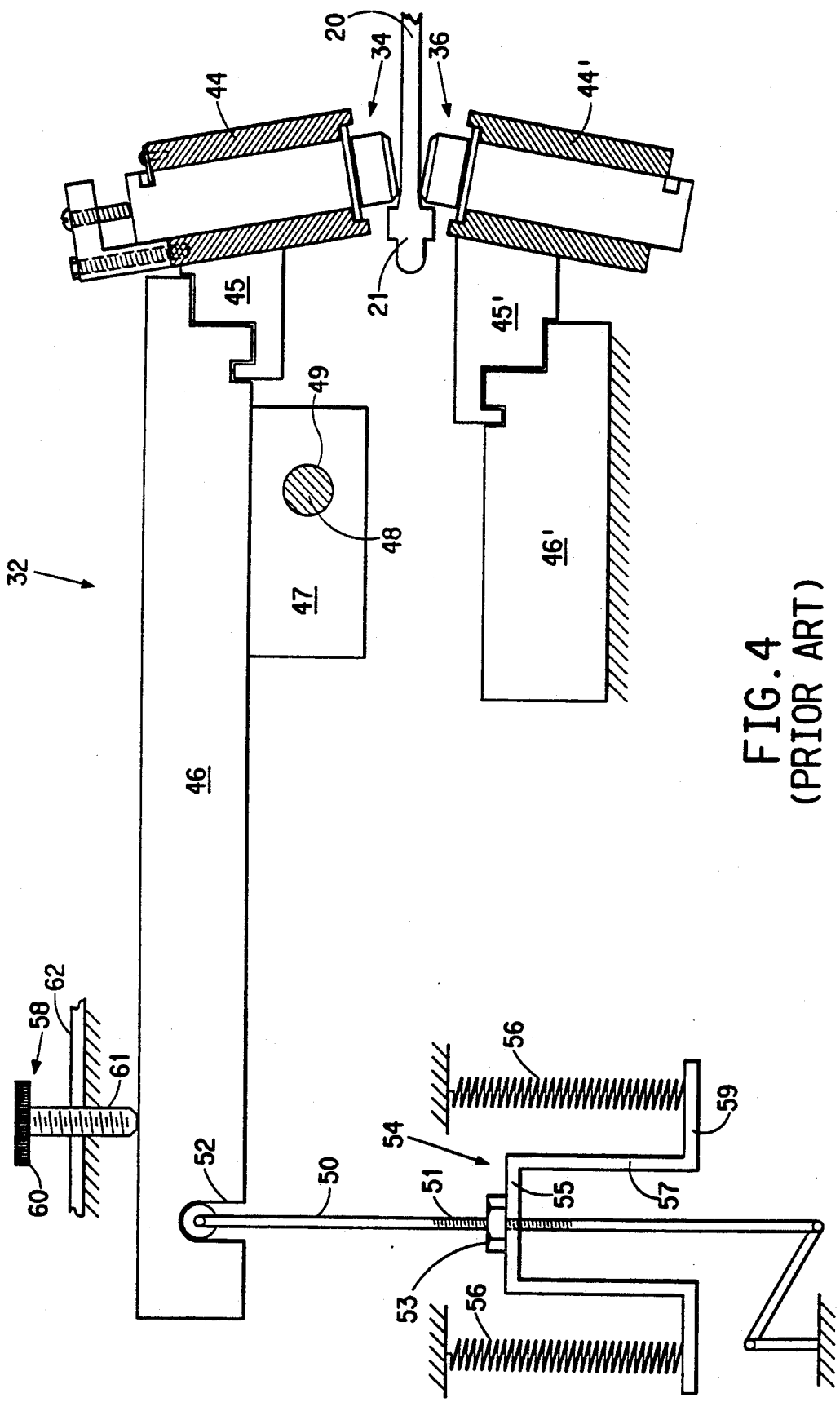
FIG. 4 is a cross sectional view of the gripper block, as seen along line 4—4 of FIG. 3, particularly illustrating the guiding of the film by a gripper pair.

FIG. 4 illustrates a typical guiding gripper assembly of a longitudinal stretcher which is useable in the process of the present invention. In the embodiment illustrated in FIG. 4, upper beam 44 is movable and lower beam 44' is stationary. If desired, lower beam 44' may be moveably mounted in lieu of or in addition to upper beam 44. As seen in FIG. 4, upper beam 44 is fixedly attached to support member 46 by bracket 45. Support member 46 is provided with an extension 47 on the lower surface thereof adjacent to bracket 45. The extension 47 has an aperture 49 therein in which pivot shaft 48 is disposed. If desired, aperture 49 may be lined with a low friction sleeve (not shown) or other means to facilitate the pivoting of support member 46. Pivot shaft 48, which may extend to a support member of an adjacent gripper block as seen in FIG. 3, is fixedly attached to the stretcher and remains stationary upon pivoting of support member 46.

At the end of support member 46 remote from beam 44 is provided a means for adjusting and controlling the pivotal motion of support member 46. In the embodiment shown in FIG. 4, this comprises an articulated rod 50 having one end engaged with a notch 52 in support member 46 and another end fixed to the stretcher, a bracket 54, springs 56 and set screw 58. Articulated rod 50 is provided with a threaded portion 51 and is disposed through bracket 54. A nut 53 is in threaded engagement with threaded portion 51 of rod 50 and is positioned above bracket 54. Bracket 54, as seen in FIG. 4, is substantially in the shape of an inverted U and has a top segment 55, legs 57 connected to top segment 55 and extending downwardly therefrom, which legs 57 have outwardly turned ends to form appendages 59. Spring 56 are attached to appendages 59 of bracket 54 and to the stretcher and pull bracket 54, nut 53, and articulated rod 50 upward. The upward urging of rod 50 in turn urges support member 46 to pivot in a clockwise direction as seen in FIG. 4, thus causing beam 44 to move toward the plane of film 20.

To control the pivotal motion of support member 46, a set screw 58 is provided to engage the upper surface of support member 46. Set screw 58 has a head 60 and a shank 61. The shank 61 is in threaded engagement with member 62, which is fixed relative to support member 46, whereby upon application of torque to head 60, shank 61 will move axially. The axial movement of screw 58, through the contact of shank 61 with support member 46, functions to limit the pivotal movement of the support 46 about pivot shaft 48. Preferably, screw 58 has a precision threaded shank 61 whereby screw 58 can be used to raise and lower the upper beam 44 and grippers 34 relative to film 20.

The lower beam 44' carries a plurality of lower grippers 36 in substantial register with upper grippers 34. Beam 44' is affixed to the stretcher by a lower support 46', via bracket 45'. As noted above, it is preferred that lower beam 44' and lower grippers 36 be stationary. If desired, however, lower beam 44' may have a support structure similar to that of upper beam 44, whereby either or both of upper and lower beams 44, 44' are movable relative to film 20.

Figure 4A:
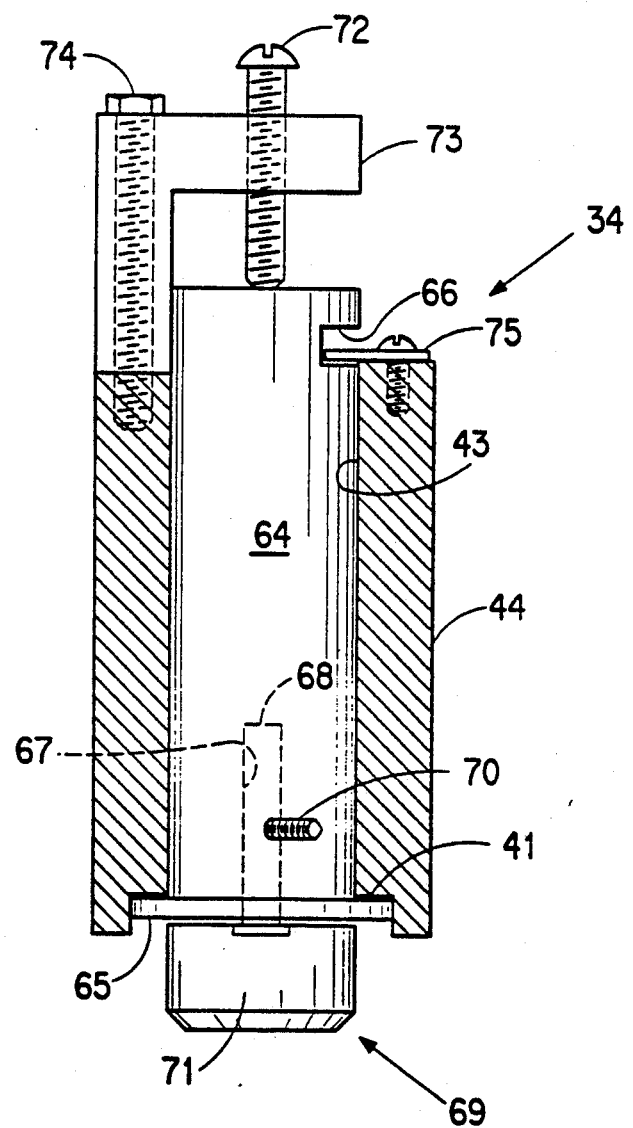
FIG. 4A is an enlarged cross sectional view of the upper gripper of FIG. 4, particularly illustrating the means for adjusting the gripper.

With reference now being made to FIG. 4A, the structure of a typical guiding gripper will now be described with reference to upper gripper 34 of FIG. 4, it being understood that the structure of lower gripper 36 of FIG. 4 is substantially identical thereto. Gripper 34 comprises a substantially cylindrical barrel 64 having an annular flange 65 at one end thereof. Barrel 64 is disposed within a bore 43 in beam 44, with flange 65 being seated within recess 41 of beam 44. At the end remote from flange 65, barrel 64 is provided with an opening 66, which may be in the form of an annular groove or a simple notch. Barrel 64 is provided with a bore 67 at the end having flange 65 into which is disposed the shaft 68 of bearing assembly 69. Set screw 70 affixes bearing assembly 69 within the barrel 64 and facilitates removal and replacement of the bearing assembly in the event of damage or excessive wear. Affixed to shaft 68 of bearing assembly 69 is a bearing cap 71 which rotates freely relative to shaft 68 by means of a plurality of bearings (not shown). As noted above, the bearing caps 71 may and often do make contact with the surface of the film. In that event, the caps 71 spin freely without any appreciable frictional resistance against the longitudinal movement of the film through the stretcher.

Adjustment of gripper barrel 64 relative to beam 44 is accomplished by means of a screw 72 disposed within L-shaped bracket 73 which is fixedly secured to beam 44 by any conventional fastening means, such as for example bolt 74. A stop member 75 attached to beam 44 cooperates with notch 66 of barrel 64 to limit the upward and downward travel of barrel 64 relative to the beam. In order to adjust the clearance between a guiding gripper pair, it is necessary to rotate adjustment screw 72 so that the maximum distance between the grippers is within the desired tolerance.

Obviously, the forces of gravity will tend to pull the barrel 64 downward. Stop member 75 prevents gravity from pulling the barrel 64 out of upper beams 44, particularly in the absence of film between the grippers, while annular flange 65 and recess 41 prevent the same occurrence with respect to the grippers in the lower beam 44'. The upward travel of barrel 64 in upper beam 44, such as would occur when film is present between the grippers or when an imperfection in film thickness is encountered, is limited by adjustment screw 72 and stop member 75. The grippers in lower beam 44' are not normally subjected to forces which would cause the barrels to move upward and, therefore it is unnecessary to control the upward travel of those gripper barrels.

Figure 5:
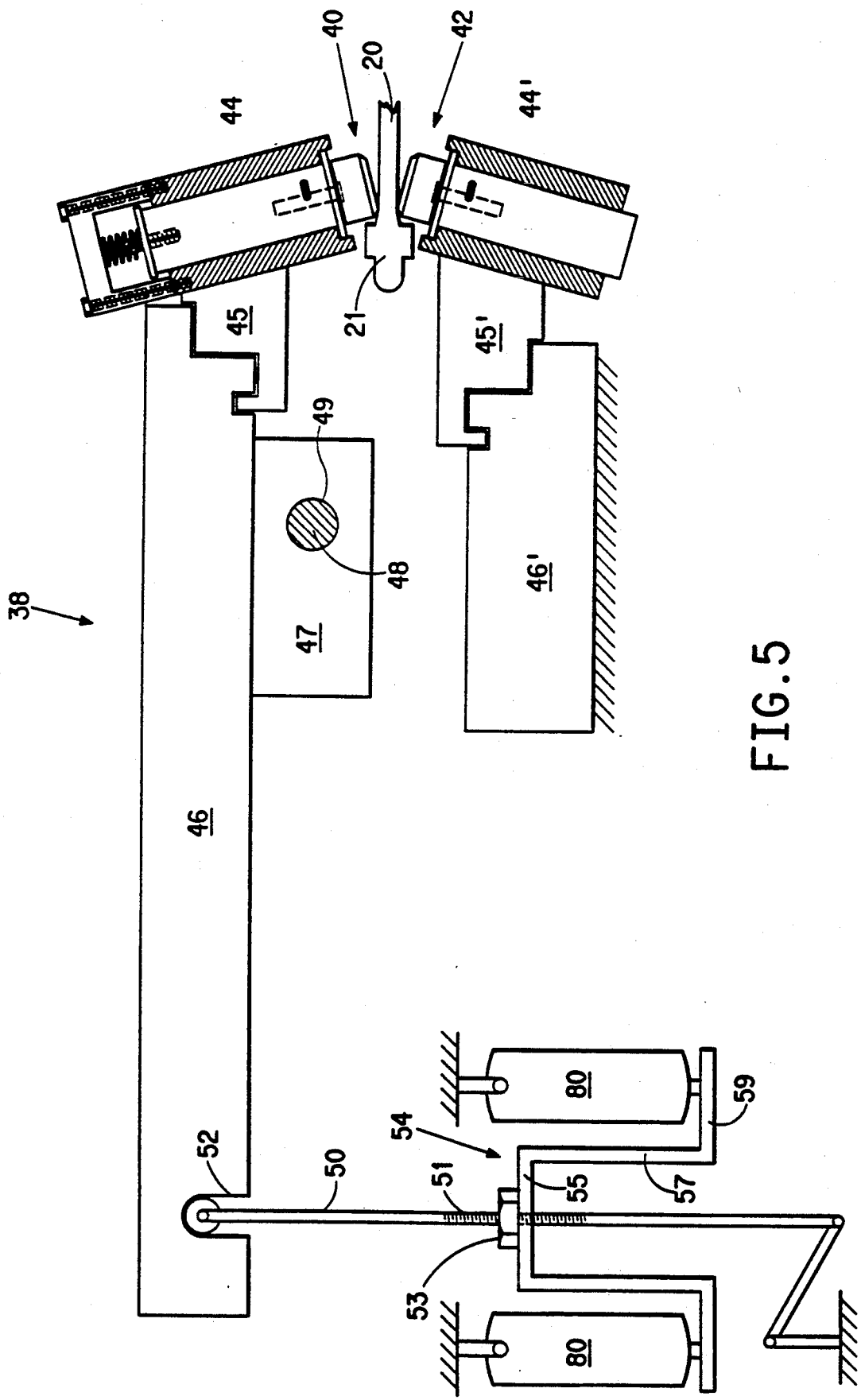
FIG. 5 is a cross sectional view of a gripper block, similar to FIG. 4, particularly illustrating the gripping of the film by the gripper pair and the means for supporting and adjusting the gripper block to exert a predetermined amount of gripping force to the film.

FIG. 5 illustrates a preferred embodiment of a typical force control gripper pair 38 in accordance with the present invention. The force control gripper pair comprises an upper gripper 40 and a lower gripper 42 carried by upper and lower beams 44, 44', respectively. The support structure for the force control gripper pair 38 is substantially identical to that previously described for the guiding gripper pair 32 with respect to FIG. 4 and comprises upper and lower brackets 45, 45' which attach beams 44, 44' to their respective support members 46, 46'. Upper support 46 is provided with an extension 47 having aperture 49 through which pivot shaft 48 is disposed, as already described. As in the case of the guiding grippers 32, the force control grippers 38 are illustrated with only the upper beam 44 being movable, it being understood that, if desired, the lower beam 44' need not be stationary.

In order to obtain force controlled gripping in the longitudinal stretcher in accordance with the process of the present invention, it was necessary to modify the structure illustrated in FIG. 4. This modification was necessary because force controlled gripping in accordance with the present invention requires that a carefully controllable and substantially constant force be applied to the film. The apparatus illustrated in FIG. 4 was unable to satisfy these criterion in that it lacks the ability for measuring and/or adjusting the force exerted and it is difficult to obtain a substantially constant force. In addition, the apparatus depicted in FIG. 4 lacks the flexibility needed for controlling the force, particularly when films of different thicknesses are run in the same stretcher, and thus fails to meet one of the primary objects of the present invention.

Accordingly, the means for adjusting and controlling the pivotal movement of the force controlled grippers, as seen in a preferred embodiment in FIG. 5, comprises an articulated rod 50 having a threaded section 51, with one end of the rod being engaged with the support member 46 and the other end being secured to the stretcher. A U-shaped bracket 54 having top portion 55, legs 57 and outwardly tuned appendages 59 cooperates with rod 50 by means of nut 53 being in threaded engagement with the threaded portion 51 of rod 50. A pair of pneumatic cylinders 80 are affixed at one end to the appendages 59 of bracket 54 and at the other end to the stretcher. In this arrangement, support member 46 is made to pivot about pivot shaft 48 by changing the air pressure in the pneumatic cylinders 80. Because the pneumatic cylinders 80 maintain nearly constant force and because it is this force which is controlled and not the gripper clearance, the adjustment screw 58 is unnecessary in this embodiment.

Figure 5A:
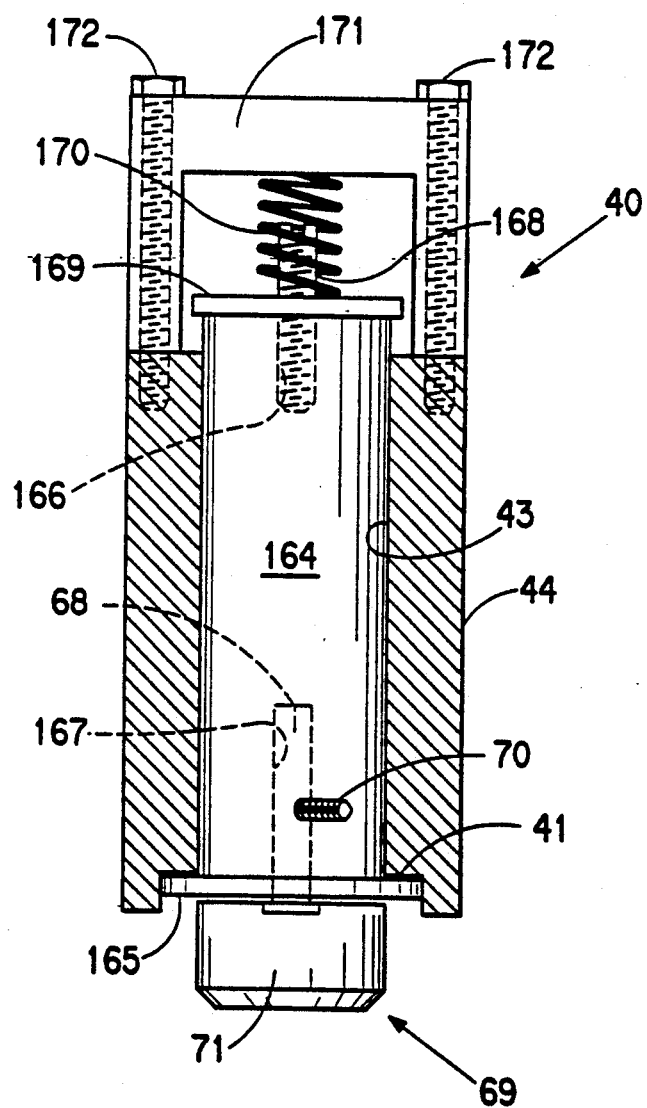
FIG. 5A is an enlarged cross sectional view of the upper gripper of FIG. 5, particularly illustrating the preferred means for adjusting the gripper in accordance with the present invention.

A preferred embodiment of an upper force control gripper 40 in accordance with the present invention is illustrated in FIG. 5A and comprises a barrel 164 having a bore 167 at one end thereof into which is disposed shaft 68 of bearing assembly 69. As in the guiding gripper of FIG. 4A, the bearing assembly 69 is removably affixed to barrel 164 by set screw 70. An annular flange 165 may be provided on barrel 164 at the end proximate to the attachment of bearing assembly 69, which flange is adapted to be received within recess 41 of beam 44. At the end of barrel 166 remote from flange 165 is a tapped aperture 166 which is adapted to receive screw 168 therein. An annular flange 169 is rigidly affixed to screw 168 and rotates therewith. The flange 169 is of greater dimension than the diameter of the bore 43 in beam 44. A spring 170 is disposed about screw 168 and against flange 169 at one end and, at the other end, against bracket 171. The bracket 171 comprises a substantially U-shaped member and is secured to the beam 44 by conventional means, such as bolts 172. It should be understood that other force regulating devices, such as pneumatic cylinders, are suitable substitutes for springs 170. In either case, each individual gripper will exert a predetermined and substantially constant force on the film.

In accordance with the invention, there are three techniques in which to exert force controlled gripping on the film. The first technique, referred to herein as block force control, is to activate the pneumatic cylinders 80 to move the upper beam 44 toward the film until the desired amount of force is exerted on the film in a direction perpendicular to the plane thereof. If this technique is used, it is unnecessary to use the grippers depicted in FIG. 5A and grippers having the structure illustrated in FIG. 4A may be used.

The second technique, referred to herein as individual force control, is to use grippers having the structure of FIG. 5A with springs 170 being selected, based upon spring constant and geometry, so as to exert the desired amount of force on the film. In this technique, it is not necessary for beams 44 or 44' to be movable. The third technique is a combination of the first two and is the preferred technique in accordance with the invention. This technique combines force exerted by block control through the use of pneumatic cylinders and force exerted by the individual grippers through the use of springs or the like, whereby the total force exerted on the film by all of the grippers in beam 44 equals the force exerted by the beam 44 distributed to all of the grippers in the beam. In any of the three techniques, either the upper or lower grippers can be made to exert the force on the film.

Throughout the stretching process, the film is continuously changing in thickness, becoming thinner as it is stretched longitudinally. Also, because the film is being heated and cooled, it has various degrees of resiliency with which it can withstand intimate contact by the gripper bearings without damage. For example, when the film first enters the second heating zone 26, the surfaces of the film are in a softened state, but the core of the film is not. Thus, at this point the film is not actually being stretched longitudinally because it has not yet reached the glass transition temperature. As a result, force controlled gripping during this stage of the process had such narrow tolerance limits that it was virtually impossible and clearance controlled gripping was necessary.

The transition point in the process when the film actually begins to stretch longitudinally is the preferred location at which clearance controlled gripping is replaced by force controlled gripping. During this portion of the process, the amount of gripping force needed to constrain the film laterally without damaging the film varies along the stretching span and is determined by experimentation. It is preferred that the gripping force be established by block control first, beginning with the blocks closest to the exit of the stretcher and working backwards, i.e., upstream, toward the first blocks having force controlled grippers. Generally speaking, the film will be most resilient at the end of the stretching operation which makes it easier to establish the proper gripping force.

A preferred method for determining the transition point at which the film actually begins to stretch is to measure the linear speed of the gripper caps with a stroboscopic tachometer and compare that with the speed of the entrance and exit nip rollers of the stretcher. When the linear speed of the bearing caps is greater than the speed of the entrance nip rollers and less than the speed of the exit nip rollers, the film is stretching. If the linear speed of the bearing caps is equal to the speed of either set of nip rollers, the film is not being stretched. In circumstances where the several types of film having different thicknesses are to be run through the same stretcher, it is preferable to determine the transition point of each film and begin the force controlled gripping for all films at the transition point of the film having the longest pretransition span.

EXAMPLE

The following example is intended to illustrate the process of the present invention and the apparatus for use in same and is not to be construed as a limitation on either. In a specific embodiment employing a polyester film, molten polyethylene terephthalate was cast to form an amorphous sheet of as-cast film of 0.0535 inch [0.1359 cm] thickness. The as-cast sheet was passed into a longitudinal stretcher as described above. The film entered the stretcher at about 65° C., and was heated to about 70° C.-95° C. and then cooled to about 65° C. The rotational speed of the exit nip rollers was about 3.5 faster than the rotational speed of the entrance nip rollers. The film was stretched in the longitudinal direction with the gripper bearings guiding and constraining the beaded edges of the film as described in this specification. Table 1 describes the conditions used for the grippers to guide and constrain the stretching film on each longitudinal side of the film. Zone refers to a longitudinal portion of the stretcher which coincides with the placement of two blocks diametrically opposed to each other on the two longitudinal edges of the film. Block refers to an upper beam and a lower beam which hold registered sets of grippers; the upper beam is above the film and is movable and the lower beam is below the film and is stationary. In this example, each gripper block, including the clearance controlled gripper assemblies, used 4 air cylinders of 0.75 inch [1.91 cm] nominal diameter to control block pressure. The air cylinders used were Model No. UDR-12, manufactured by Clippard Instrument Lab, Cincinnati, Ohio. The length of springs used in all the constraining gripper assemblies was 1.25 inch [3.18 cm], and the springs were made of stainless steel.

TABLE 1

| Zone | Number of Grippers/ Beam | Gripper Bearing Clearance - Average Film Thickness in. [cm] | Gripper Spring Constant lb/in [gm/cm] | Block Pressure psi [kg/sq. cm] |
|---|---|---|---|---|
| 1 | 52 | Begin 0.0115 [0.0292] tapering to 0.0065 [0.0165] at end | — | 90 [6.3] |
| 2 | 13 | 0 | 10.8 [1929] | 45 [3.2] |
| 3 | 15 | 0 | 10.8 [1929] | 22 [1.5] |
| 4 | 26 | 0 | 10.8 [1929] | 30 [2.1] |
| 5 | 30 | 0 | 22.5 [4019] | 30 [2.1] |
| 6 | 30 | 0 | 22.5 [4019] | 30 [2.1] |
| 7 | 30 | 0 | 22.5 [4019] | 30 [2.1] |

The taper of the gripper bearing clearance in Zone 1 was set by primarily using the stop bock set screws at the beginning and end of the zone in conjunction with the individual set screw adjustment of the gripper bearings. The block pressure was at the maximum in Zone 1 in order to hold the support assembly against the stop thereby assuring that the guiding grippers retained their position in the event of any thickness disturbances in the polymeric film. The excess gripper clearance (Gripper Clearance - Average Film Thickness) in Zone 1 tapered to 0.0065 inch [0.0165 cm], in order to better guide the film into Zone 2. Zone 2 used the combination of stop block set screws and block pressure to assure that there was enough pressure to hold the support assembly against the stop blocks but allow for possible process upsets. The grippers in Zone 2 were set so that the bearings just touched and that a gap was formed when the film forced up the springs in the grippers. Actual spring compression was 0.2 in. [0.51 cm] (mechanical preload) plus the film thickness. In Zones 2–7, the gripper springs are compressed to about 33% of the spring length.

The as-cast film was stretched to 0.0154 inch [0.0392 cm] thickness using the gripper conditions shown in Table 1. The as-cast film was stretched continuously, without the need to realign the grippers or with any other operational upsets associated with the grippers. The film produced was defect-free.

What is claimed is:

1. In a process for longitudinally stretching a sheet of film having thickened longitudinal edges while the film is being transported and stretched in the longitudinal direction and while constraining the film in the lateral dimension with a plurality of successive pairs of grippers disposed inside and adjacent to the thickened longitudinal edges of the film and above and below the film, wherein the improvement comprises:

(a) first guiding the film for a predetermined distance with a first group of said pairs of grippers having a predetermined clearance therebetween; and (b) gripping the film with a second group of said pairs of grippers with a predetermined amount of force applied substantially perpendicular to the film.

2. The process according to claim 1, wherein the step of gripping the film with said second group of gripper pairs comprises adjusting at least one gripper in each said gripper pair to exert said predetermined amount of force to the film.

3. The process according to claim 1, wherein the step of gripping the film with said second group of gripper pairs comprises adjusting at least one gripper in each said gripper pair to exert a force on the film, wherein said gripper pairs are attached to and carried by at least one beam, adjusting said at least one beam to exert a force on the film, and wherein the force exerted by said at least one beam is distributed to said gripper pairs attached to and carried by said at least one beam and equals said predetermined amount of force.

4. The process according to claim 1, wherein the step of gripping the film with said second group of gripper pairs comprises adjusting at least one beam, wherein said gripper pairs are attached to and carried by said at least one beam, to exert said predetermined amount of force to said film.

5. The process according to claim 1, wherein the step of guiding the film with a first group of gripper pairs comprises adjusting at least one gripper in each of said gripper pairs to provide said predetermined amount of clearance.

6. The process according to claim 1, wherein the step of guiding the film with said first group of gripper pairs comprises adjusting at least one beam, wherein said first group of gripper pairs is attached to and carried by said at least one beam, to provide said predetermined amount of clearance.

7. The process according to claim 1, wherein the step of guiding the film with a first group of gripper pairs comprises adjusting at least one gripper in each of said gripper pairs to provide a first clearance, wherein said gripper pairs are attached to and carried by at least one beam, adjusting said at least one beam to provide a second clearance, and wherein said first and second clearances together provide said predetermined amount of clearance.

8. The process of claim 1, wherein the step of guiding the film with said first group of gripper pairs further comprises varying the amount of clearance whereby the predetermined amount of clearance is lowest immediately prior to the film being engaged by said second group of gripper pairs.

9. The process of claim 8, wherein the predetermined amount of clearance varies between zero and 0.015 inches (0.0381 cm) greater than the average thickness of the film.

10. The process of claim 1, wherein the step of gripping the film with a predetermined amount of force begins at the point at which the film actually begins to stretch longitudinally.

* * * * *